Nov. 30, 1954  E. R. PRICE  2,695,983
MOTOR-DRIVEN TRANSMISSION OPERATING MECHANISM
Filed June 3, 1949  2 Sheets-Sheet 1
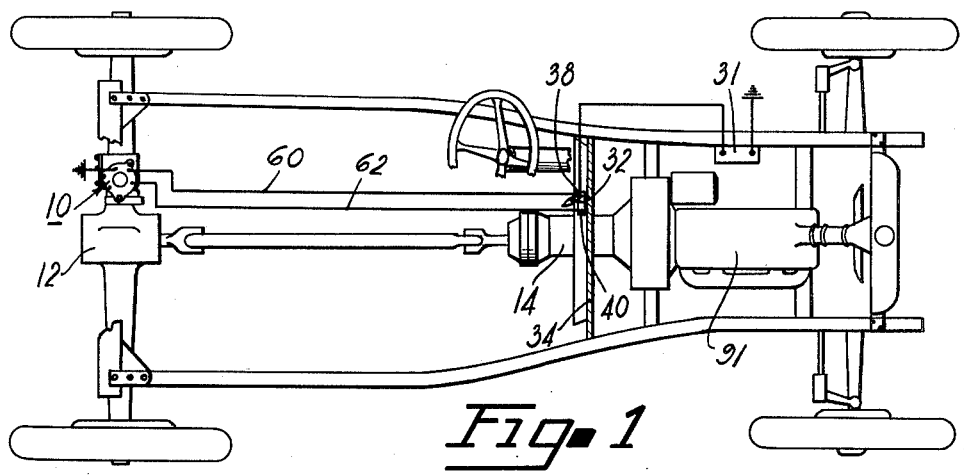
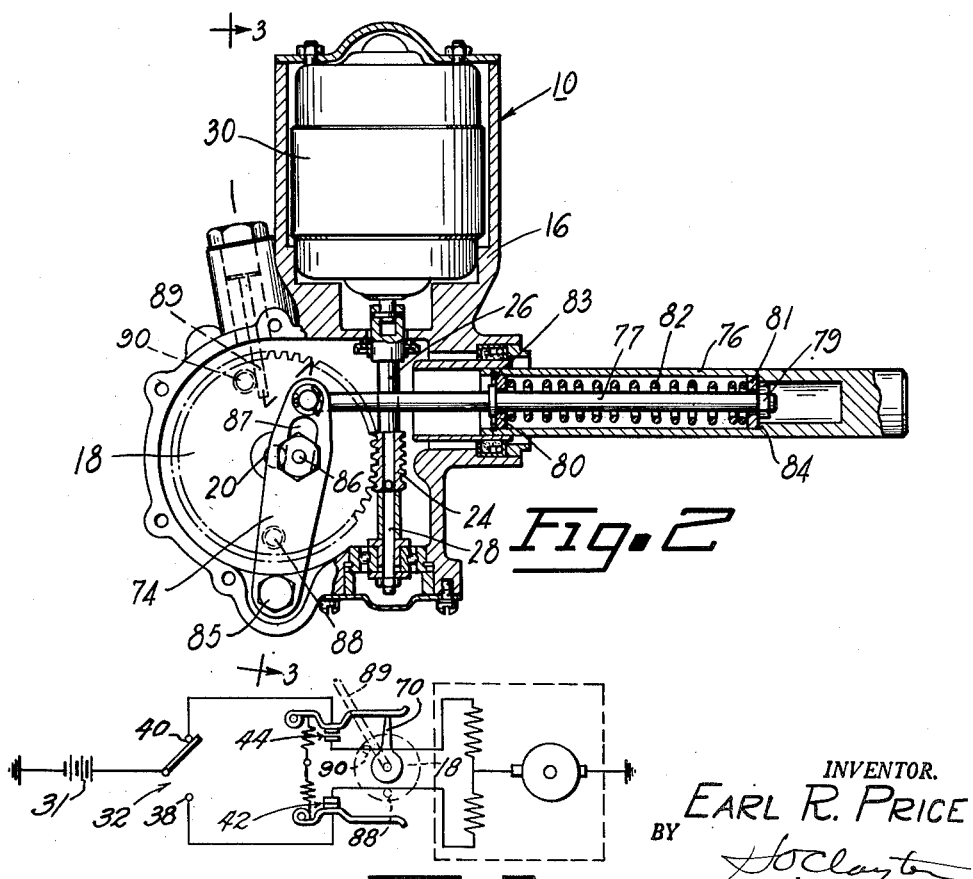
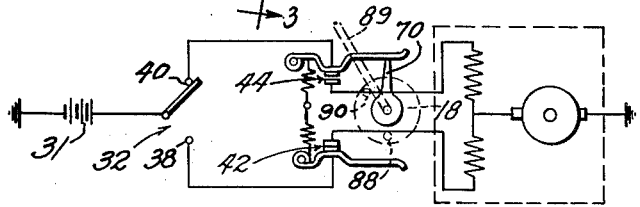
INVENTOR.
EARL R. PRICE
BY
ATTORNEY Nov. 30, 1954     E. R. PRICE     2,695,983
MOTOR-DRIVEN TRANSMISSION OPERATING MECHANISM
Filed June 3, 1949     2 Sheets-Sheet 2
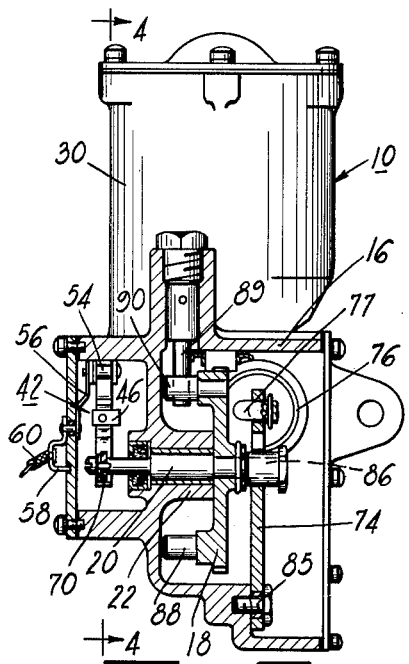
Fig. 3
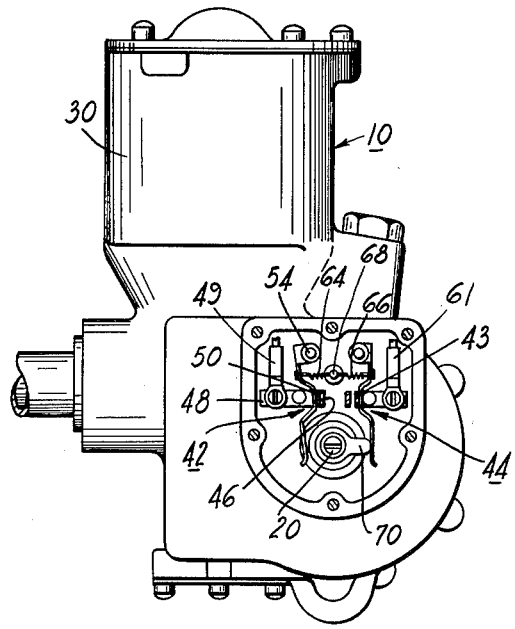
Fig. 4
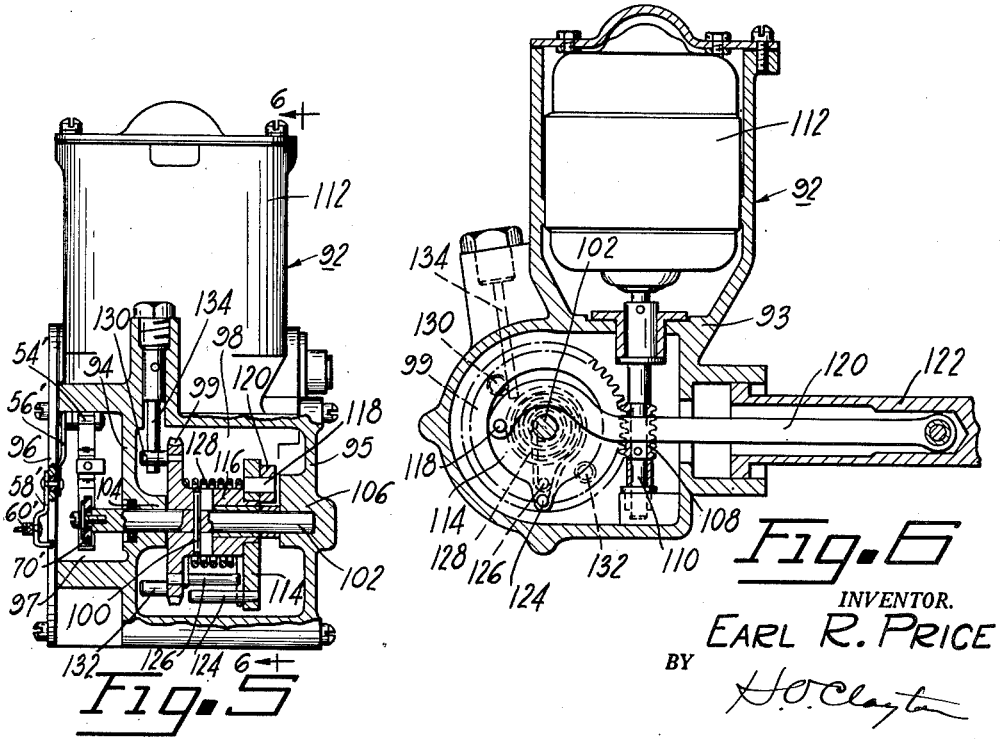
Fig. 5
Fig. 6
INVENTOR.
EARL R. PRICE
BY
H.C.Clayton
ATTORNEY

United States Patent Office 2,695,983
Patented Nov. 30, 1954

2,695,983

MOTOR-DRIVEN TRANSMISSION OPERATING MECHANISM

Earl R. Price, South Bend, Ind., assignor to Bendix Aviation Corporation, South Bend, Ind., a corporation of Delaware Application June 3, 1949, Serial No. 97,011

4 Claims. (Cl. 318—267)

This invention relates to power actuated mechanisms for selectively moving a control element to one or the other of two operative positions, and more particularly to gear shifting mechanisms for operating the speed changing gearing commonly used in coupling the engine or prime mover with the driving wheels or the like of an automotive vehicle or the propeller of a marine craft.

One of the objects of my invention is to provide a power shifting mechanism for motor vehicle change speed mechanism that is electrically selective under the control of the driver.

A further object of the invention is to provide a compact, easily serviced and relatively simple double acting power unit well adapted for use in mechanism for operating the shiftable elements of the two speed axle structure of an automotive vehicle.

The above and other objects and features of the invention will appear more fully hereinafter from a consideration of the following description taken in connection with the accompanying drawings where two embodiments of the invention are illustrated by way of example.

Figure 1 is a diagrammatic view of an automotive vehicle embodying the transmission operating mechanism of my invention;

Figure 2 is a view, largely in section, disclosing details of a preferred embodiment of the power unit of my invention;

Figure 3 is a sectional view, taken on the line 3—3 of Figure 2, disclosing other details of the power unit of my invention;

Figure 4 is a sectional view, taken on the line 4—4 of Figure 3, disclosing the motor operating cut out switches of the electrical control means of Figure 1;

Figure 5 is a sectional view disclosing details of another embodiment of the power unit of my invention;

Figure 6 is a sectional view, taken on the line 6—6 of Figure 5, disclosing details of the power unit of the latter figure; and Figure 7 is a diagrammatic view disclosing the electrical hook-up of the electrical mechanism of my invention.

The transmission operating power means constituting my invention is preferably employed to operate a two speed axle transmission mechanism of an automotive vehicle; however, it may be employed to operate any power transmitting mechanism of the power plant of a land or marine vehicle wherein said mechanism is selectively movable to two operative positions.

Referring to Figure 1 a transmission operating power unit 10 is detachably mounted on the carrier of what is known in the automotive art as a two speed axle, that is a part of the driving mechanism of the vehicle effecting a gear ratio in addition to the usual driving ratio and different therefrom. This two speed axle mechanism, actuated by the shifter mechanism of my invention, is indicated by the reference numeral 12 and a change speed transmission mechanism cooperating therewith is indicated by the reference numeral 14. The transmission operating mechanism constituting my invention may be employed to operate a Maybach clutch type of two speed axle. however, any other well known two speed axle construction is equally well operated by the mechanism of my invention.

There is disclosed, in Figures 2 to 4 inclusive, a preferred embodiment of the power unit 10 of the transmission operating mechanism of Figure 1, said unit constituting an important feature of my invention. Describing this unit a casing 16 is shaped to receive a worm gear 18 drivably mounted upon a multi-diametered shaft 20 journalled in a boss 22 constituting a part of the casing. The worm gear is driven by a worm 24 drivably connected to a shaft 26; and this shaft is rotatably mounted, at its lower end 28, in the base of the unit. At its upper end the shaft 26 is preferably drivably connected to the shaft of a double field reversible electric motor 30 of any well known design.

As is disclosed in Figures 1 and 4 the motor 30, which is grounded, may be controlled by electrical means including a manually operated single pole double throw selector switch 32 conveniently mounted on the control panel 34 within the driver's compartment of the vehicle. The movable contact of the switch 32 may be electrically connected to a grounded battery 31; and fixed contacts 38 and 40 of said switch are electrically connected, respectively, to a motor operated cut out switch 42 and a motor operated cut out switch 44, all as is disclosed in Figure 4. The switch 42 preferably includes a fixed contact 46 mounted upon a plate 48 secured to the motor casing 16 and electrically connected, by a conductor 49, to one of the field windings of the motor 30. The switch 42 also includes a movable contact 50 pivotally mounted upon a post 54, Figure 3, to which there is secured the upper end of a clip 56 the lower end of which is secured to but insulated from a side wall of the motor casing. A clip 58 likewise secured to the casing, and a conductor 60 complete the electrical connections between the movable contact 50 of the switch 42 and the contact 38 of selector switch 32, the contact 50, post 54, and clips 56 and 58 being of electrically conductive material.

The switch 44, being a duplicate of the switch 42, is not described in detail herein. Suffice it to say that the movable contact 43 of the switch 44 is electrically connected, by means including a conductor 62, to the contact 40 of the selector switch 32; and the fixed contact 41 of the switch 44 is electrically connected, by means including a conductor 61, to the other field winding of the motor 30. Completing the description of the switches 42 and 44, springs 64 and 66, secured to a post 68 of electrical insulating material, serve, respectively, to bias the movable contacts 50 and 43 to their switch closed positions. The means for opening the switches 42 and 44 includes a cam 70 of electrical insulating material, secured to a reduced end portion of the shaft 20, Figure 3; and as will be apparent from an inspection of Figure 4 the cut-out operation of the switches 42 and 44 is effected by an angular movement of the cam.

Describing now one of the features of my invention, that is the double acting yieldable force transmitting means interconnecting the motor driven worm gear 18 and the two speed axle mechanism 12, a shifting fork, not shown, within the latter mechanism is yieldingly connected to a pitman arm or crank 74 of a crank and pin connection by means including a hollow rod 76. The latter member is connected at one of its ends to the shifting fork of the two speed axle mechanism, and within the hollowed out portion of its other end receives a connecting rod 77. The latter end of the rod 76 is slidably mounted within an opening 78 in the motor casing and when so mounted becomes a part of the motor unit 10. The rod 77 is pivotally connected at its inner end to the pitman arm 74 and its outer end is threaded to receive a thrust nut 79. Thrust washers 80 and 81, having a loose fit over the rod 77, are biased, by a preloaded spring 82, into engagement, respectively, with a flange 83 secured to the rod 76 and a shoulder portion 84 of said rod.

The crank and pin connection between the rod 77 and worm gear 18 includes the aforementioned pitman arm 74 which is pivotally mounted, at 85, upon the casing 16; and the remaining part of the crank and pin connection includes a two part pin 86, having an off center mounting in the worm gear 18, and extending laterally from said gear. The pin 86 projects through a slot 87 in the pitman arm.

Describing now the operation of the transmission operating mechanism disclosed in Figures 1 to 4 inclusive, it will be assumed that the vehicle is under way with the two speed axle mechanism 12 established in its low gear setting; and it will also be assumed that when so established the parts of the mechanism assume the positions disclosed in the several figures of the drawing. In this position of the parts the switch 42 is closed, the switch 44 is opened, and the parts of the yieldable connection assume the positions disclosed in Figure 2.

It will be now assumed that the driver of the vehicle has increased its speed and that he desires a high gear setting of the transmission 12. To this end the driver will operate the selector switch 32 to select contact 38 and this operation closes an electrical circuit including the then closed switch 42. The motor 30 is thus energized resulting in a rotation of the worm gear 18 in a counter-clockwise direction, Figure 2; and the latter operation effects a movement of the rod 77 to the left, Figure 2.

Now it will be further assumed that the aforementioned high gear operation of the selector switch 32 was effected prior to a release of the accelerator of the vehicle and this being the case the driving or so-called torque transmitting load to which the parts of the transmission 12 are at the time subjected will prevent a leftward movement of the hollow rod 76 as the spring 82 is being compressed by the leftward movement of the rod 77. Explaining the operation of compressing the spring 82 the washer 80, when the parts of the mechanism are in their low gear position, abuts the flange 83 secured to the end of the then stationary rod 76; accordingly, the leftward movement of the rod 77, together with the thrust nut 79 and the thrust washer 81, results in a compression of said spring thereby imparting a transmission operating load upon the then stationary rod 76.

The high gear preselecting operation of the mechanism having been thus completed the parts remain in the above described positions awaiting a release of the accelerator to make possible an expansion of the spring 82 to effect a high gear operation of the transmission.

Describing now an important feature of my invention after the worm gear 18 has rotated a certain angular distance during the above described high gear preselecting operation of the mechanism, the cam 70, in its counter-clockwise rotation, Figure 4, moves away from the movable contact 43 thereby effecting a closing of the switch 44; and with continued rotation the cam contacts the movable contact 50 to open the switch 42. The motor 30 is accordingly de-energized, however, the inertia of the then rotating worm gear and moving parts connected thereto may result in a continued movement of these parts. To limit this movement to a degree sufficient to effect a maximum or substantially maximum compression of the spring 82 and to prevent a reclosing of the switch 42 there is provided a pin 88 which contacts a stop 89 when the gear 18 has been sufficiently rotated. As disclosed in Figures 2 and 3 the stop 89 is mounted in the motor casing 16 and is contacted by the pin 88 which is mounted in and extends laterally from the worm gear 18; and the stop 89 is contacted by a pin 90 when said gear is rotated in a clockwise direction, Figure 2, in the operation of establishing the transmission in its low gear setting. As with the pin 88 the pin 90 is mounted in and extends laterally from the gear 18, all as is disclosed in Figure 3.

There is thus provided stop means for controlling the operation of the cut off switches and for effecting the desired operation of the yieldable force transmitting means 76, 77, and 88 prior to a release of the accelerator, the latter operation making possible the desired operation of the transmission; for if the stop means were omitted from the motor unit of my invention the spring 82 would be unduly compressed thereby shortening its life; and the operation of the stop means in preventing a reclosing of the cut off switches serves to prevent an undesired re-energization of the electric motor after its normal operation has been completed.

Continuing the description of the operation of the mechanism of my invention, to effect the high gear setting of the transmission, the driver will release the accelerator: and this operation effects the necessary torque reversal operation of the power plant of the vehicle; for when the accelerator is released the internal combustion engine 91 of the vehicle no longer serves as a prime mover to load the gears or equivalent means of the transmission and thereby prevent a de-meshing operation thereof. It follows therefore that when the driver releases the accelerator the cocked spring 82 becomes free to expand to move the rod 76 to the left, Figure 2, to de-mesh the gears or their equivalent mechanism establishing the transmission in its low gear setting and then remesh the gears to establish the transmission in its high gear setting; and it is to be noted that this operation is, by virtue of the operation of the spring 82, performed quickly and quietly. The remeshing operation may however be delayed until the driving and driven elements of the transmission are synchronized and thereby conditioned to effect the remeshing operation.

If the driver releases the accelerator or disengages the friction clutch of the vehicle prior to operation of the selector switch 32 to effect an operation of the transmission, then the spring 82 will tend to be cocked as the driving and driven elements of the transmission are being synchronized; and this operation insures a relatively quiet meshing operation inasmuch as the force exerted by the cocked spring may be of a relatively low factor.

Continuing the description of the operation of the mechanism of my invention, the transmission having been established in its high gear setting, the accelerator may be operated in the usual manner to increase, decrease, or maintain the speed of the vehicle. When a low gear setting of the transmission is desired the switch 32 is operated to move the selector lever into engagement with switch contact 40, corresponding to low gear position, which completes a circuit through the then closed cut-off switch 44 and the other field winding of the motor 30. As will be apparent from the preceding description, this operation, assuming it is effected prior to the release of the accelerator or disengagement of the friction clutch, will effect an energization of the motor 30 resulting in a cocking of the spring 82 the worm gear 18 rotating clockwise and the rod 77 moving to the right, Figure 2, in effecting this operation; and as with the previously described high gear operation of the mechanism, the motor 30 is automatically de-energized by an operation of the cut off switch 44 and the rotation of the worm gear 18 is stopped when the pin 90 contacts the stop 89. A release of the accelerator to reverse the torque will then result in an expansion of the spring 88 to effect the desired low gear setting of the transmission, the parts assuming the positions disclosed in Figure 2.

There is disclosed in Figures 5 and 6 another embodiment of the transmission operating power unit of my invention said unit being indicated as a whole by the reference numeral 92. In this embodiment a casing 93 is provided with a partition 94; and this partition, together with end plates 95 and 96 and the wall of the casing, outline two compartments 97 and 98. The compartment 98 houses a worm gear 99 mounted upon and secured, by a pin 100, to a switch operating shaft 102 journalled at one end in a hub portion 104 of the partition 94, and at its other end in a hub portion 106 of the end plate 95. The worm gear 99 is driven by a worm 108, Figure 6, drivably mounted upon a shaft 110; and the latter is journalled, at its upper and lower ends, in portions of the casing 93. The shaft 110 is drivably connected to the shaft of a double field reversible electric motor 112 of any well known design. This electric motor and the electric controls therefor, including a cut out switch mechanism housed in the compartment 97, duplicate the motor and controls of the embodiment of my invention disclosed in Figures 1 to 4, inclusive; accordingly, said controls are not disclosed herein. The parts of the mechanism housed within the compartment 97 and secured to the motor casing, which duplicate corresponding parts of the mechanism of Figure 3 are given the same reference numerals with the addition of a prime.

Describing now the yieldable transmission operating force transmitting means of the power unit 92 a crank 114, rotatably mounted on a sleeve member 116 mounted on the shaft 102, is pivotally connected by a crank pin 118 to a connecting rod 120. As is disclosed in Figure 6 this rod is, at one of its ends, bent around the shaft 102 and is pivotally connected, at its outer end, to a hollow rod 122 which is in turn adapted to be connected to the shifter fork of the two speed axle mechanism of Figure 1. As is disclosed in Figure 6 the latter rod is slidably mounted in a portion of the casing 93; and said rod 122 and the rod 120 connected thereto, together constitute a part of the motor unit. As is disclosed in Figure 5, to the crank 114 and worm gear 99 there are secured, respectively, pins 124 and 126. A preloaded torsion spring 128, sleeved over a hub portion of the worm gear and over the sleeve 116, is connected at one of its ends to the pin 124 and at its other end to the pin 126. Stop means, including pins 130 and 132 mounted on the worm gear 99, and a stop 134 mounted in the motor casing, serve to limit the loading of the torsion spring 128 and to control the operation of the cut off switch mechanism, in the same manner as does the corresponding stop mechanisms 88, 89, and 90 of the embodiment of my invention disclosed in Figures 2 to 4, inclusive.

Briefly describing the operation of the transmission operating unit 92 of Figures 5 and 6 a closure of the above described selector switch prior to a release of the accelerator results in an energization of the motor 112; and the latter operation results in a rotation of the worm gear 99 to wind up the spring 128. Then when the driver releases the accelerator to reverse the driving torque the spring 128 expands thereby effecting a transmission operating movement of the rod 120 in one or the other of its two directions of movement depending of course on the particular operation of the transmission selected by the driver.

There is thus provided, by either of the transmission operating units 10 and 92 together with the controls therefor, an effective and efficient transmission operating mechanism well adapted to operate either a two speed axle of an automotive vehicle or other change speed transmission of the power plant of the vehicle. The motor units 10 and 92, constituting the essence of my invention, both include relatively few moving parts comprising a worm and worm gear unit driven by a double field reversible electric motor said unit being connected to the transmission by yieldable force transmitting means including a crank and pin mechanism and a spring member. With both units the timed cutting out of operation of the electric motor, by the operation of the cut off switches, serves, in cooperation with the operation of the stop mechanism, to insure the desired inertia operation of the moving parts to effect a maximum compression of the spring; and with both units the operation of the yieldable force transmitting means positioned between the worm and worm gear mechanism and the transmission, insures a relatively quiet operation of the transmission.

Although only two embodiments of the invention have been illustrated and described, various changes in the form and relative arrangements of the parts may be made to suit requirements.

I claim:

1. A power unit adaptable to operate a change speed transmission of an automotive vehicle including a casing, a reversible electric motor housed within a portion of the casing, said motor comprising a drive shaft, a gear and gear wheel driven mechanism drivably connected to said shaft, a transmission operating rod mounted in the casing, force transmitting means interconnecting the rod and gear wheel including a crank and pin connection and further including a spring which is energized when the motor is energized to effect an operation of the unit, cut off switch mechanism for controlling the operation of the motor to limit the degree of energization of the spring, means connected to the gear wheel for operating the switch mechanism, and stop means, including a part mounted on the worm gear, for limiting the movement of said gear wheel and the parts connected thereto, after the switch mechanism has operated to de-energize the motor.

2. A power unit adaptable to operate a two speed axle transmission of an automotive vehicle including a double field reversible electric motor, a worm and worm gear unit connected to the drive shaft of the motor, a transmission operating rod, double acting force transmitting means interconnecting the rod and worm gear including a spring which is compressed when the motor is energized, a motor cut off switch mechanism for in part controlling the operation of the motor to control the degree of compression of the spring, means connected to the worm gear for operating the switch mechanism, and stop means for limiting the spring compressive movement of the worm gear, said stop means coming into play after the cut off switch means is operative to de-energize the motor.

3. A power unit adaptable to operate a change speed transmission including a reversible electric motor including a drive shaft, a second shaft within the unit, a worm gear mounted on the latter shaft, a worm mounted on said drive shaft and serving to interconnect the worm gear and motor, cut off switch mechanism for controlling the operation of the motor, a cam member mounted on the second shaft and operative to actuate the switch mechanism, a transmission operating rod, force transmitting means interconnecting the rod and worm wheel including spring means which is compressed, by an operation of the motor, to condition the same for a subsequent transmission operating operation of the rod; and a stop means for limiting the spring compressive movement of the worm gear, said stop means coming into play after the cut off switch mechanism is operative to de-energize the motor.

4. A preassembled unit for use in the transmission operating mechanism of an automotive vehicle comprising a casing, a motor housed within the casing, a worm gear and a worm mechanism housed within the casing the worm being drivably connected to the drive shaft of the motor, a motor controlling cut off control mechanism within the casing, means, actuated by the worm gear, for operating the control mechanism, a crank pivotally mounted on the casing, force transmitting means interconnecting the worm gear and crank, a rod slidably mounted in the casing, force transmitting means, including a yieldable member, interconnecting the rod and crank, and stop means housed within the casing and operable to limit the inertia movement of the worm gear and parts connected thereto after the control mechanism is operative to de-energize the motor.

References Cited in the file of this patent

UNITED STATES PATENTS

| Number | Name | Date |
| --- | --- | --- |
| 1,327,567 | Miles | Jan. 6, 1920 |
| 1,560,070 | McNamara | Nov. 3, 1925 |
| 1,813,087 | Sandage | July 7, 1931 |
| 1,850,341 | Dean | Mar. 22, 1932 |
| 1,854,941 | Kiel | Apr. 19, 1932 |
| 2,017,641 | Uhlig | Oct. 15, 1935 |
| 2,196,774 | Lundgren | Apr. 9, 1940 |
| 2,328,897 | Gill | Sept. 7, 1943 |
| 2,337,769 | Redenbo | Dec. 28, 1943 |
| 2,397,092 | Drexler | Mar. 26, 1946 |
| 2,402,343 | Price | June 18, 1946 |
| 2,435,440 | Graham | Feb. 3, 1948 |
| 2,454,256 | Meyers | Nov. 16, 1948 |
| 2,462,779 | Russell | Feb. 22, 1949 |
| 2,499,166 | Russell | Feb. 28, 1950 |

FOREIGN PATENTS

| Number | Country | Date |
| --- | --- | --- |
| 553,316 | Great Britain | May 17, 1943 |